United States Patent [19]

Stough, III

[11] Patent Number: 5,259,573
[45] Date of Patent: Nov. 9, 1993

[54] APPARATUS AND METHOD FOR IMPROVING SPIN RECOVERY ON AIRCRAFT

[75] Inventor: H. Paul Stough, III, Yorktown, Va.

[73] Assignee: The United States of America as represented by the Administrator of the National Aeronautics and Space Administration, Washington, D.C.

[21] Appl. No.: 948,057

[22] Filed: Sep. 21, 1992

[51] Int. Cl.$^5$ ............................................... B64C 9/02
[52] U.S. Cl. .................................... 244/75 R; 244/87
[58] Field of Search ................ 244/87, 1 R, 13, 45 R, 244/45 A, 88, 89, 75 R

[56] References Cited

U.S. PATENT DOCUMENTS

| | | | |
|---|---|---|---|
| 1,038,507 | 9/1912 | Crocco et al. | 244/87 |
| 1,803,805 | 5/1931 | Lanier | 244/45 R |
| 2,044,108 | 6/1936 | Siquefield | 244/87 |
| 2,405,907 | 8/1946 | Schmitt | 244/13 |
| 2,595,192 | 4/1952 | Garby | 244/87 |
| 3,815,650 | 6/1974 | Hickey | 244/1 R |
| 4,163,534 | 8/1979 | Seeger | 244/87 |

*Primary Examiner*—Galen Barefoot
*Attorney, Agent, or Firm*—Kimberly A. Chasteen

[57] ABSTRACT

An apparatus and method for improving spin recovery characteristics of aircraft involves attaching the horizontal tail of the aircraft to the aircraft such that a gap remains between the root end of each horizontal tail section and the fuselage or vertical tail of the aircraft. The gaps measure between about 15% and 30% of the tail semispan. The gaps may be covered by fairings which are released or opened should a spin occur.

18 Claims, 5 Drawing Sheets

APPARATUS AND METHOD FOR IMPROVING SPIN RECOVERY ON AIRCRAFT

ORIGIN OF THE INVENTION

The invention described herein was made by employees of the United States Government and may be used by and for the Government for governmental purposes without the payment of any royalties thereon or therefor.

TECHNICAL FIELD OF THE INVENTION

The present invention relates generally to aircraft control, and more particularly to a method for recovering from spins.

BACKGROUND OF THE INVENTION

Previous research on airplane spinning and recovery has shown that at potential spin conditions (high angles of attach with rotation) the horizontal tail, depending upon its location, can create a wake about the vertical tail and rudder which can adversely affect airplane spin and recovery characteristics. Many methods of altering the tail geometry to modify these interference effects have been investigated for improving airplane spin and recovery characteristics. Examples of changes include relocation of the horizontal tail, increasing control surface travel, and use of a "flip tail" that can be rotated to extreme angles for spin recovery. Forced-oscillation tests and rotary-balance tests have identified configurations and conditions for which removal of the horizontal tail reduces or eliminates autorotative characteristics.

It is accordingly an object of the present invention to provide an airplane having improved spin recovery characteristics.

It is another object of the present invention to provide an airplane having enhanced yaw damping at conditions conducive to spinning.

It is another object of the present invention to achieve the foregoing objects in a simple manner.

Additional objects and advantages of the present invention are apparent from the drawings and specification which follow.

SUMMARY OF THE INVENTION

According to the present invention, the foregoing and additional objects are obtained by providing an apparatus for improving spin recovery characteristics of an airplane. Either one or both of the horizontal tail sections of the aircraft are attached to the aircraft fuselage or vertical tail such that a gap is formed between the root end of the norizontal tail section and the fuselage or vertical tail. The gap between the tail horizontal section(s) and the fuselage or vertical tail measures between about 15% and 30% of the semi-span of the horizontal tail. A releasable or detachable cover may be provided which covers the gaps formed between the horizontal tail sections and the fuselage or vertical tail.

DETAILED DESCRIPTION OF THE INVENTION

Figure 1:
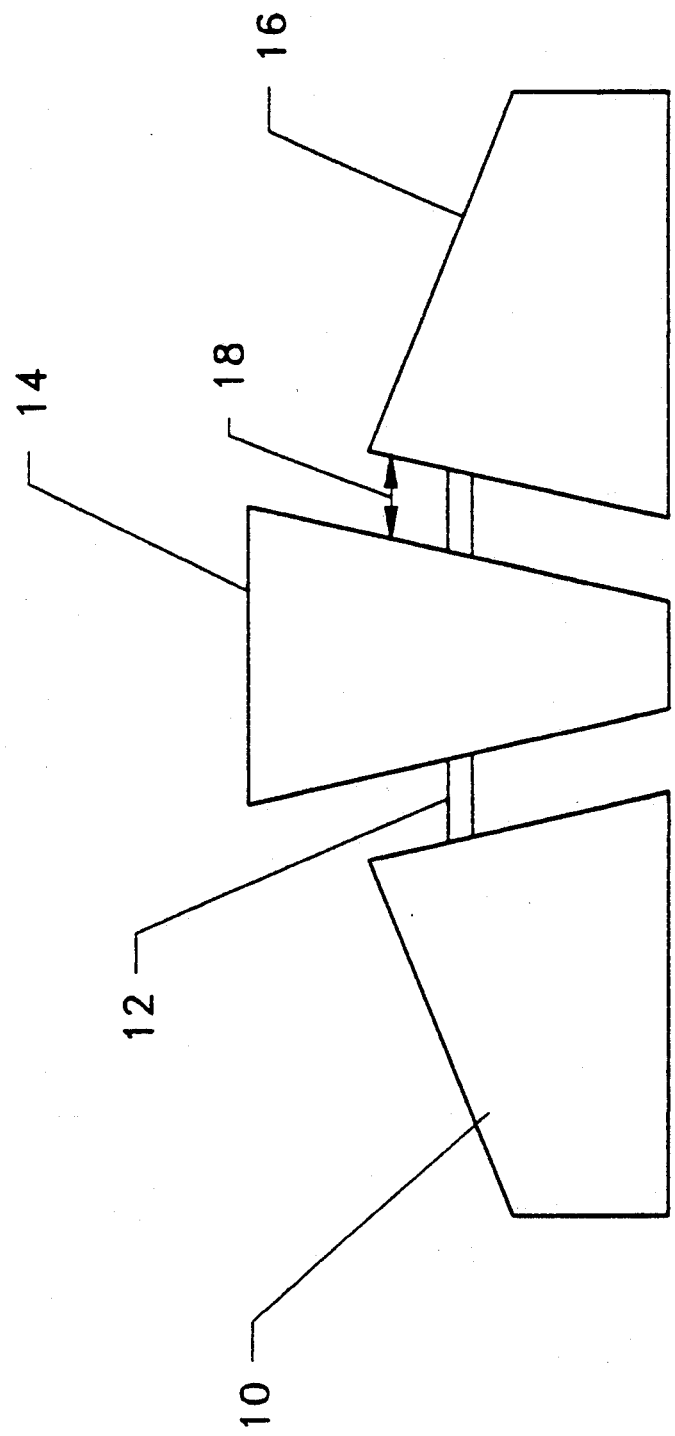
FIG. 1 is a top view of an aircraft tail.
Figure 2:
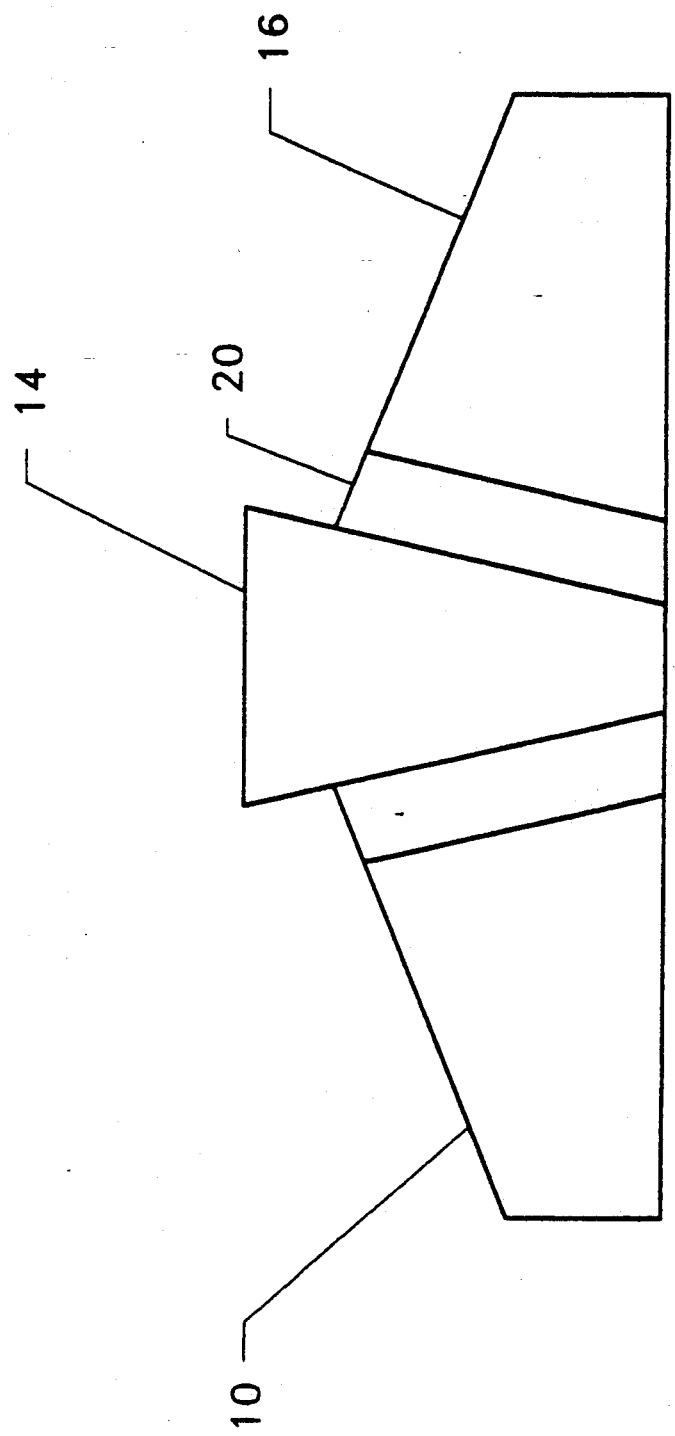
FIG. 2 is a top view of an aircraft tail.

FIG. 1 shows a top view of an aircraft tail section. The left horizontal tail section 10 is attached to the fuselage 14 using support structure 12 leaving a gap 18 between the root end of the tail section 10 and the fuselage 14. The horizontal tail sections 10, 16 may be attached to the fuselage via the vertical tail (not shown) of the aircraft. The width of the gap 18 is between about 15% to 30% of the span of one tail section. FIG. 2 shows an embodiment of the invention in which the gap 18 is covered by a fairing 20. In flight, this fairing 20 is ejected or opened in the case of a spin. If the aircraft is in a right spin, for optimal spin recovery at least the right fairing is ejected or opened. If the aircraft is in a left spin, at least the left fairing is ejected or opened.

EXAMPLE

Spin tunnel tests are performed to predict the spin and spin-recovery characteristics that are likely to be encountered during planned flight testing or through inadvertent loss of control of a full-scale airplane at altitude. This prediction is made based upon the results of extensive free-spinning tests of dynamically scaled models in a spin tunnel interpreted in the light of correlations obtained between model tests and flight tests for similar configurations.

This invention has been tested on a 1/11-scale model in a spin tunnel. The model was modified to have gap widths from 0% to 31% of the unmodified horizontal tail semispan. Left and right side gap widths were varied independently and simultaneously to determine the optimal spin recovery positions.

The model was ballasted to obtain dynamic similarity to the airplane at an altitude of 10,000 ft (3048 m). A remotely controlled, digital-proportional servo mechanism was installed in the model to actuate the rudder control for recovery attempts. The mechanism provided sufficient torque on the control to reverse it fully and rapidly for the recovery attempts. Rudder travel was ±25°. The maximum control deflections used on the model were the same as those for an airplane.

Reynolds number for the tests ranged from approximately $5.9 \times 10^5$/ft to $9.6 \times 10^5$/ft, based on average tunnel speed and sea-level conditions. The model control surfaces were preset to the desired prospin deflections and the model was hand launched into the vertically rising airstream. Prospin controls consisted of ailerons neutralized, rudder full prospin, and elevator in one of three positions: 25° trailing edge up, neutral, and 15° trailing edge down. After the spin became steady, the rudder was reversed to the full antispin position. Ailerons and elevator were maintained at the prospin setting throughout the recovery attempt. Turns for recovery were measured from the time that the controls were moved to the time that the spin rotation ceased.

In typical spin tunnel model tests, recoveries taking more than 10 turns are deemed unrecoverable. Because of the exploratory nature of these tests and the need to look for trends in recovery characteristics with changes in gap width, model motions following recovery control input were tracked for much longer periods than in typical spin tunnel tests. In some cases, the recoveries were tracked for over 250 turn. Allowing recoveries to proceed beyond 10 turns enabled differences in damping between the windward and the leeward gaps to be studied, even with the large range of results that it produced. Only erect spins were investigated.

Data were acquired from high-speed color video images of the tests. Angles of attack and bank were read from the video. A time code susperimposed on the video enabled determination of spin rate. Results determined in free-spinning tunnel tests are estimated to be correct within the following limits: angle of attack and bank, ±2 deg; rate of descent and rotation rate, ±1 percent; an reovery, ±¼ turn.

For the mass, inertia, and control settings tested, ventilating the rudder and vertical stabilizer with gaps at the root of the horizontal tail significantly improved the spin recovery characteristics; however, gap widths between 15% and 25% of the horizontal tail semispan gave optimal performance. Gaps that did not change the spin attitute from flat to steep had either no effect on the spin recovery or provided a marginal improvement in recovery, depending on the orientation of the gaps and the setting of the prospin controls. During spin tests, gaps on the leeward side of the tail (insside of the spin) were much more influential in changing the characteristics of the windward side of the tail (outside of the spin). Symmetric gaps (open on both sides) produced generally better recoveries at intermediate gap widths. For large gaps, having only the leeward (inside of the spin) gap resulted in the quickest recoveries or actually prevented a developed spin from occurring. Overall, gaps measuring 15% of the horizontal tail semispan wide and full trailing-edge-down elevator defection in conjunction with rudder reversal provided the most effective recovery.

Figure 3:
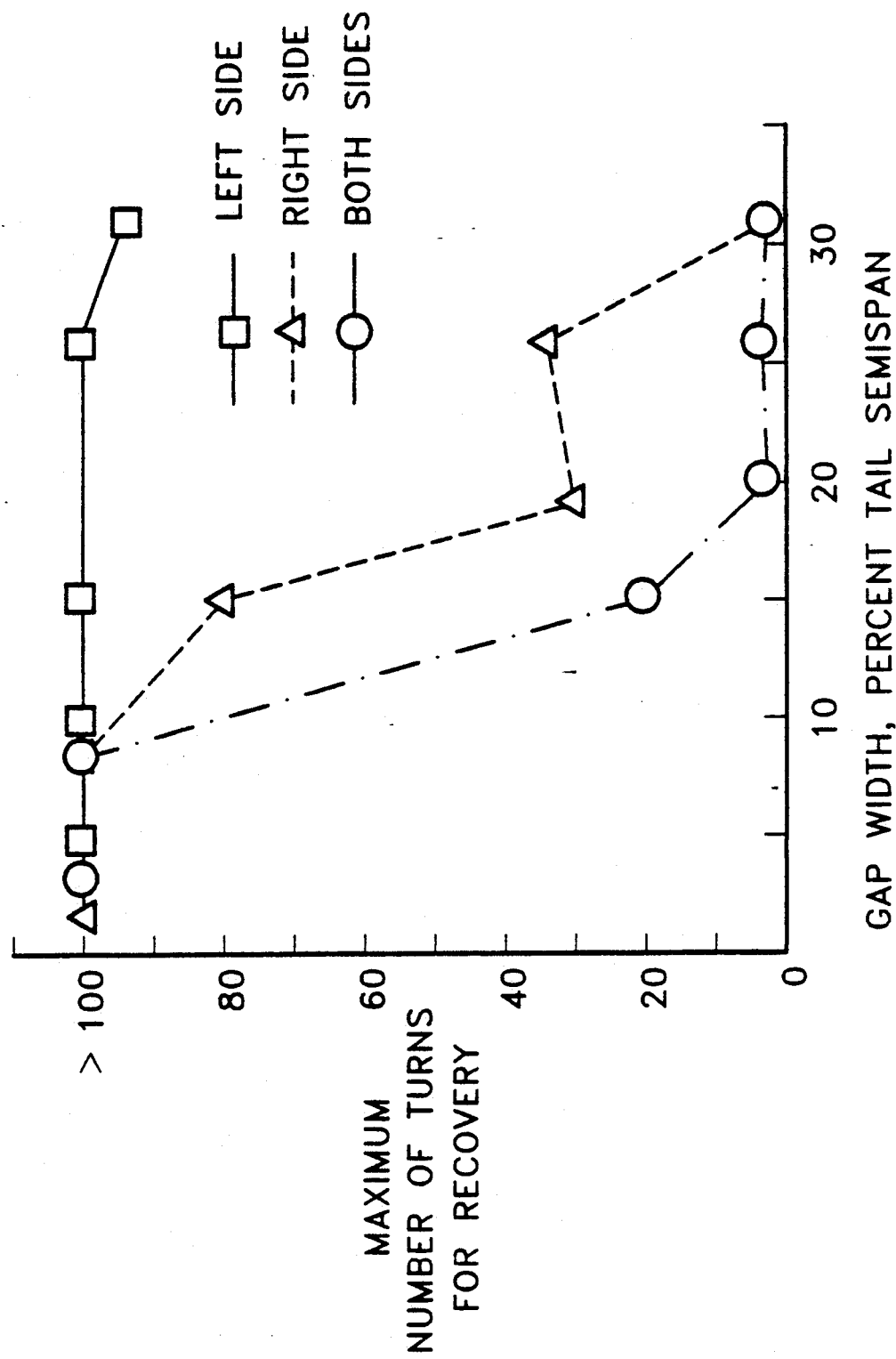
FIG. 3 shows test results for model with elevator in the 25° trailing-edge-up position.
Figure 4:
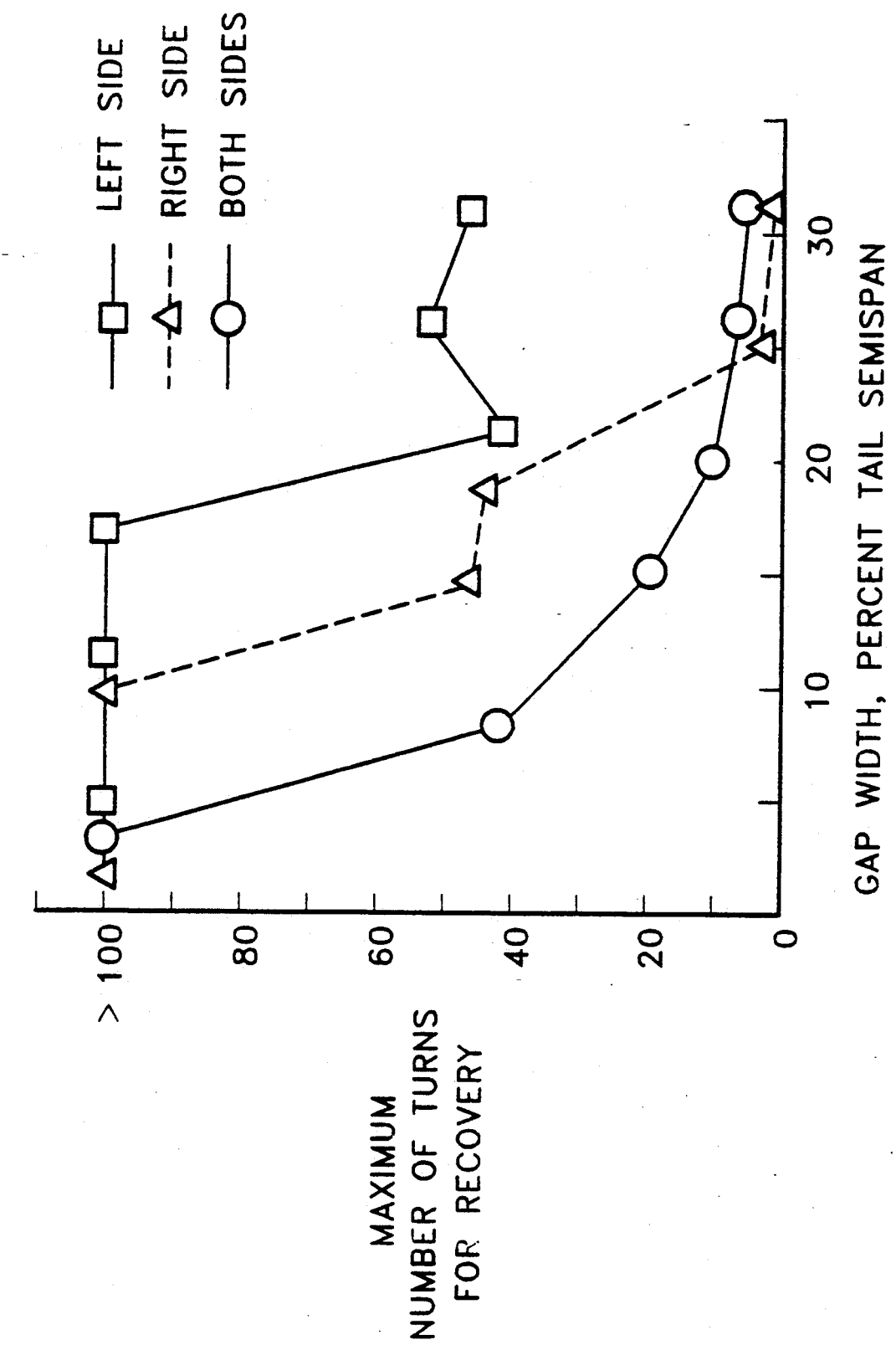
FIG. 4 shows test results for model with elevator in the neutral position.
Figure 5:
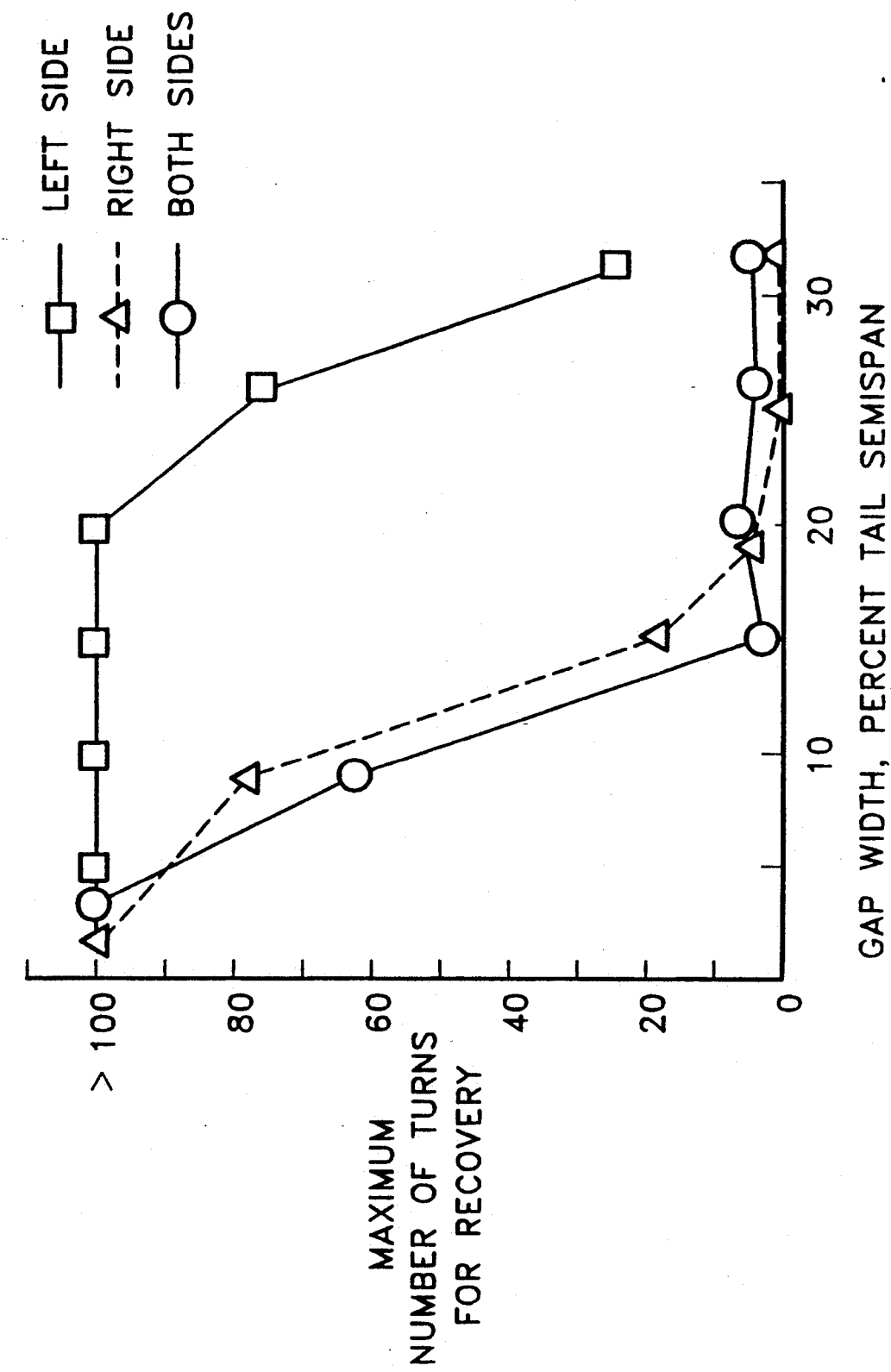
FIG. 5 shows test results for model with elevator in the 15° trailing-edge-down position.

FIG. 3 shows test results for a model in a right spin with the elevator in the 25° trailing-edge-up position. FIG. 4 shows test results for a model in a right spin with the elevator in the neutral position. FIG. 5 shows test results for a model in a right spin with the elevator in the 15° trailing-edge-down position.

I claim:

1. An apparatus for improving spin recovery characteristics of an airplane, comprising:
   an airplane having a fuselage, a vertical tail, a left horizontal tail section and a right horizontal tail section, each of the horizontal tail sections having a root end; and
   means for attaching the right tail section to the fuselage such that a gap which prevents wake formed on the right horizontal tail section from interfering with the flow over the vertical tail section is formed between the root end of right tail section and the fuselage.

2. The apparatus for improving spin recovery characteristics of an airplane as recited in claim 1, wherein the gap formed between the root end of the right tail section and the fuselage measures between about 15% and 30% of the span of the tail section.

3. The apparatus for improving spin recovery characteristics of an airplane as recited in claim 1, further comprising:
   means for attaching the left tail section to the fuselage such that a gap which prevents wake formed on the left horizontal tail section from interfering with the flow over the vertical tail section is formed between the root end of the left tail section and the fuselage.

4. The apparatus for improving spin recovery characteristics of an airplane as recited in claim 3, wherein the gaps formed between the root ends of the left and right tail sections and the fuselage measure between about 15% and 30% of the span of the tail section.

5. The apparatus for improving spin recovery characteristics of an airplane as recited in claim 3 further comprising a means for releasably covering each of the gaps.

6. The apparatus for improving spin recovery characteristics of an airplane as recited in claim 1 further comprising a means for releasably covering the gap.

7. An apparatus for improving spin recovery characteristics of an airplane, comprising:
   an airplane having a fuselage, a vertical tail, a left horizontal tail section and a right horizontal tail section, each of the horizontal tail sections having a root end; and
   means for attaching the left tail section to the fuselage such that a gap which prevents wake formed on the left horizontal tail section from interfering with the flow over the vertical tail section is formed between the root end of left tail section and the fuselage.

8. The apparatus for improving spin recovery characteristics of an airplane as recited in claim 7, wherein the gap formed between the root end of the left tail section and the fuselage measures between about 15% and 30% of the span of the tail section.

9. The apparatus for improving spin recovery characteristics of an airplane as recited in claim 7 further comprising a means for releasably covering the gap.

10. A method for improving spin recovery characteristics of an airplane, comprising:
    providing an airplane having a fuselage, a vertical tail, a left horizontal tail section and a right horizontal tail section, each of the horizontal tail sections having a root end; and
    attaching the right tail section to the fuselage such that a gap which prevents wake formed on the right horizontal tail section from interfering with the flow over the vertical tail section is formed between the root end of right tail section and the fuselage.

11. The method for improving spin recovery characteristics of an airplane as recited in claim 10, wherein the gap formed between the root end of the right tail section and the fuselage measures between about 15% and 30% of the span of the tail section.

12. The method for improving spin recovery characteristics of an airplane as recited in claim 10, further comprising the step of:
    attaching the left tail section to the fuselage such that a gap which prevents wake formed on the left horizontal tail section from interfering with the flow over the vertical tail section is formed between the root end of the left tail section and the fuselage.

13. The method for improving spin recovery characteristics of an airplane as recited in claim 12, wherein the gaps formed between the root ends of the left and right tail sections and the fuselage measure between about 15% and 30% of the span of the tail section.

14. The method for improving spin recovery characteristics of an airplane as recited in claim 12 further comprising the step of providing a means for releasably covering each of the gaps.

15. The method for improving spin recovery characteristics of an airplane as recited in claim 10 further comprising the step of providing a means for releasably covering the gap.

16. A method for improving spin recovery characteristics of an airplane, comprising:

providing an airplane having a fuselage, a vertical tail, a left horizontal tail section and a right horizontal tail section, each of the horizontal tail sections having a root end; and attaching the left tail section to the fuselage such that a gap which prevents wake formed on the left horizontal tail section from interfering with the flow over the vertical tail section is formed between the root end of left tail section and the fuselage.

17. The method for improving spin recovery characteristics of an airplane as recited in claim 16, wherein the gap formed between the root end of the left tail section and the fuselage measures between about 15% and 30% of the span of the tail section.

18. The method for improving spin recovery characteristics of an airplane as recited in claim 16 further comprising the step of providing a means for releasably covering the gap.

* * * * *